June 3, 1969    B. HUSOCK    3,448,033
PROTECTIVE SYSTEM
Filed Oct. 23, 1965
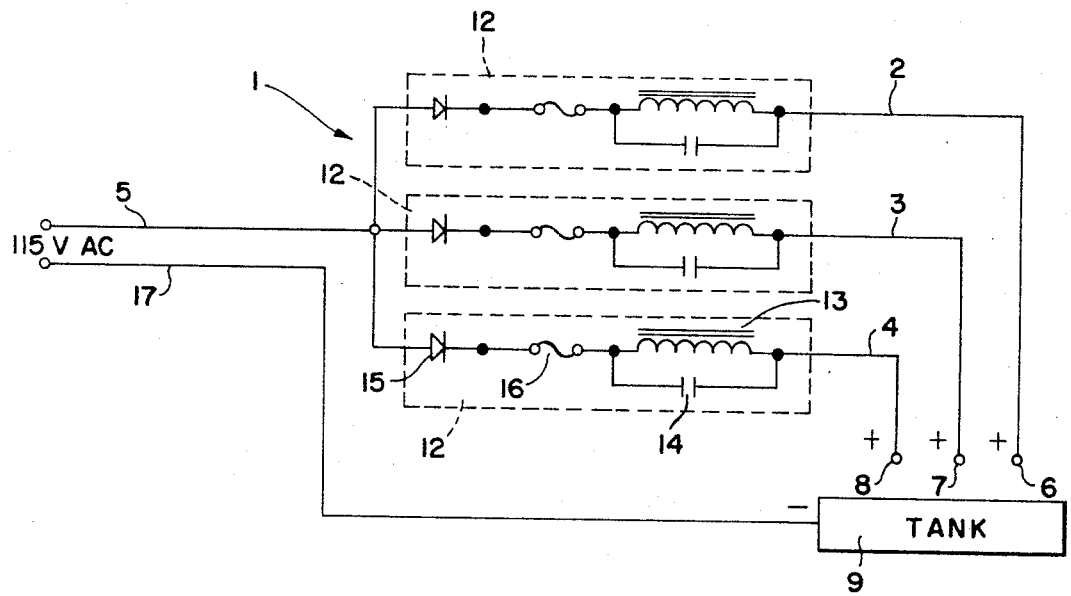
INVENTORS
BERNARD HUSOCK
BY Oberlin, Maky & Donnelly
ATTORNEYS United States Patent Office 3,448,033
Patented June 3, 1969

3,448,033
PROTECTIVE SYSTEM
Bernard Husock, South Euclid, Ohio, assignor to Harco Corporation, Cleveland, Ohio, a corporation of Ohio
Filed Oct. 23, 1965, Ser. No. 503,254
Int. Cl. C23f *13/00*
U.S. Cl. 204—196  8 Claims

ABSTRACT OF THE DISCLOSURE

A cathodic protection system for objects buried beneath the ground wherein a D.C. current is established between an anode array buried nearby and the object to be protected to nullify corrosive electrolytic action. Each anode is powered from an A.C. source by a semiconductor rectifier and parallel choke and capacitor circuit, the rectifier providing D.C. current flow and the choke and capacitor modifying the waveform and establishing a high impedance for regulation of the output current without excessive heating or power dissipation.

---

The present invention relates generally, as indicated, to a protective system and, more particularly, to certain improvements in self-regulating cathodic protection systems especially of the type shown and described in U.S. Letters Patent No. 3,143,670, granted to Bernard Husock on Aug. 4, 1964.

In such prior patent, there is disclosed a relatively simple and inexpensive impressed current cathodic protection system which is adapted to provide a substantially constant current at any given anode even though there may be a rather wide variance in the resistivity of the soil or other electrolyte in which the structure to be protected, such as a gasoline tank, for example, is buried. This substantially constant current is obtained by placing a fixed resistor, which has a resistance at least ten times as great as the resistance between the anode and the protected structure, in series with a rectifier for converting a typical 115 volt A.C. source to direct current. Accordingly, even should be conductivity of the electrolyte change rather drastically, it has been found that the current output will still deviate less than 10 percent. Thus, by employing the system of the aforementioned Husock patent, it is possible to provide the minimum current flow which will protect the buried structure, since there is no danger of a substantial drop in such flow as operating conditions change.

In the Husock Patent No. 3,143,670, it is preferred that a plurality of anodes with associated rectifiers and resistors, each having a relatively small current output of approximately 100 milliamperes, be used to provide the current necessary to protect a given structure, rather than just one or two high current output anodes, so that undesired exposure of nearby structures is negligible. While this particular cathodic protection system has been widely accepted and proven to be very effective in use, the heat generated by the resistors somewhat shortens the life of the system components. Moreover, although the current output of the patented Husock cathodic protection system is sufficiently uniform for most purposes, there are occasions when an even more uniform current output is desired. Likewise, in certain instances it is desirable to have a much more smooth, flat wave shape than the half wave shape that is produced by the rectifier and resistor system of the Husock patent for producing a voltage at the anodes which has a nearly constant magnitude.

It is therefore a principal object of this invention to provide an improved cathodic protection system which is adapted to establish a substantially constant current output at the anodes despite changes in the load resistance, and at the same time reduce substantially the amount of heat generated for longer component life.

Another object is to provide a cathodic protection system of the type indicated which is adapted to maintain a current of a substantially constant magnitude at the anodes with an improved, nearly flat wave shape.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing there is shown a circuit diagram of a preferred form of protective system in accordance with the present invention.

Turning now to the details of the drawing, the preferred embodiment of protective system in accordance with the present invention is generally indicated at 1 and comprises a plurality of lines 2, 3 and 4 connected in parallel to a lead 5 which is adapted to be plugged into an external 115 volt A.C. power source. Each of the lines 2, 3 and 4 leads to an associated anode 6, 7 and 8 buried adjacent a gasoline tank 9 or the like which is to be protected, and has removably plugged therein a can 12 containing a choke coil (inductor) 13 and capacitor 14 which are connected in parallel and then placed in series with a silicon diode rectifier 15. Also, there may be provided a separate fuse 16 for each can 12, or a single fuse (not shown) may be disposed directly in the lead 5 for all of the cans 12. Another lead 17 connects the 115 volt A.C. source to the tank 9 itself which is the cathode.

In a typical installation, the silicon diode rectifiers 15 employed may be 600 P.I.V., 1.0 ampere diodes capable of producing a pulsating half-wave unfiltered direct current. As disclosed in the aforementioned Husock Patent No. 3,143,670, if a resistor having a resistance at least ten times as great as the resistance of the electrolyte in which the anodes are submerged is placed in series with a similar type rectifier, a substantially constant current will be obtained at the anodes despite changes or variations in the resistivity of the electrolyte. However, the heat generated by the resistors will somewhat shorten the life of the various components of the system. It has been found that this heat problem can substantially be eliminated while still obtaining the same desired constant 100 milliamperes direct current at the anodes 6, 7 and 8 by substituting for the resistors a choke coil 13 and capacitor 14 in parallel with each other and in series with each of the rectifiers 15, since the actual amount of heat created by these components is quite low, and the little heat that results from the bulk of the current passing through the choke coils is dissipated at rapid rate. Accordingly, the system will operate at a much cooler temperature and thus the life of the various components will be substantially increased.

The use of choke coils 13 and capacitors 14 in parallel has an additional advantage of filtering or leveling out the pulsating half-wave direct current output of the rectifiers 15. Such outputs consists of a D.C. voltage on which there is superimposed an alternating or ripple voltage. Since a capacitor has infinite impedance to D.C. voltage but a very low impedance to ripple voltage, and a choke serves to stop the passage of ripple voltage, the D.C. voltage from the rectifiers 15 passes through the choke coils 13 while the majority of the ripple voltage passes through the capacitors 14.

The fluctuations in the ripple voltage are reduced considerably by the action of the capacitors 14 storing energy while the rectifiers 13 are putting out their pulse and allowing such energy to discharge between pulses. Moreover, the fluctuations of the small amount of ripple voltage that pass through the choke coils 13 are substantially reduced by the action of the inductor or choke coils 13 tending to prevent the current from building up or dying down. The result of these two components (choke coils 13 and capacitors 14) working together is to remove the ripple from the rectifier output and thus produce a voltage which is of a nearly constant magnitude.

In actual practice, it has been found that 1.5 henrys, 200 milliamperes choke coils 13 and 1.0 microfarad, 5 percent tolerance, 200 W.V.D.C. Mylar capacitors 14 connected in parallel and then in series with the 1.0 ampere, 600 P.I.V. silicon diode rectifiers 15 will give the desired 100 milliamperes direct current at the anodes 6, 7 and 8. Of course, the number of anodes with associated components necessary for a particular application depends upon the amount of current needed to protect a given structure. Thus, if say 900 milliamperes are required, then it would be necessary to provide nine anodes with a corresponding number of cans 12.

The use of a choke coil 13 and capacitor 14 in parallel instead of a resistor as in the Husock Patent No. 3,143,670 has other advantages as well. For example, the regulation of the direct current as the resistance of the load between the anodes 6, 7 and 8 and the tank 9 changes is better with the choke-capacitor system. Thus, it has been found that as the load changes from 0 to 200 ohms, the current in the resistor circuit changes from 125 milliamperes to 83 milliamperes. With the choke-capacitor system of the present application, on the other hand, the direct current output changes from 112 milliamperes to 89 milliamperes. Moreover, the voltage drop across the choke-capacitor system is substantially lower than the voltage drop across the resistor circuit. At 0 resistance load, for instance, the voltage drop across the resistor is 50 volts, while in the choke-capacitor system, the voltage drop at 0 resistance is 8.2 volts and at 200 ohms is 6.5 volts.

From the above discussion, it should now be readily apparent that the protective system of the present application is of a unique construction which has very good direct current output regulation at the anodes despite changes in the resistance of the load, and yet at the same time very little heat is created which could be damaging to the various components of the system. Moreover, there is very little voltage drop across this novel choke-capacitor system, and the output voltage is of a nearly constant magnitude with a nearly level or flat wave shape over the entire cycle.

Other modes of applying the principles of the invention may be employed, change being made as regards the details described, provided the features stated in any of the following claims or the equivalent of such be employed.

I therefore, particularly point out and distinctly claim as my invention:

1. A cathodic protection system for establishing a flow of current from a source of alternating current power to a protected device located in an electrolytic environment, comprising an anode located in the electrolyte closely adjacent but out of contact with the protected device, means connecting the protected device to the source of power, said means forming an electrical path for return of current from the protected device, as the cathode, to the source of power, an electric line connected at one end directly to said anode, said electric line forming a path for current flow to said anode, a rectifier in series connection between the source of power and the other end of said electric line for converting the power of the alternating current source to direct current flow between said anode and the protected device, and an inductor in series with said rectifier, said series inductor and rectifier being connected at one end to the source of power and at the other end directly to the said electric line, said inductor adapted to modify the waveshape of the direct current and to regulate the flow of current at a substantially constant low level.

2. The system as set forth in claim 1 wherein said rectifier is a semiconductor diode.

3. The system as set forth in claim 1 further including a capacitor in parallel connection with said inductor, said capacitor adapted to further modify the waveshape of the direct current to provide a substantially constant low level output from said anode.

4. The system as set forth in claim 3 further including a plug-in can for replaceably connecting said electric line to the source of power, said can having in electrical connection, said rectifier, inductor and capacitor.

5. The system as set forth in claim 3, adapted to be powered from a conventional 115 volt, 60 Hz. source of power, wherein said inductor has a value of 1.5 henrys and said capacitor a value of 1.0 microfarad.

6. A cathodic protection system for underground metal storage tanks and the like wherein a corrosion-nullifying current is directed to such tanks from a source of power comprising a plurality of anodes buried adjacent but out of contact with such tank, individual electric lines connected directly to said anodes, solid state rectifiers in series with said lines for converting the alternating current from the source of power to direct current, choke coils in series with said lines and in series connection with said rectifiers for leveling the direct current and for regulating the current flow, each of said choke coils and rectifiers being connected at one end to said source of power and at the other end directly to one of said electrical lines, and a second electric line connecting such tank with the power source as a return line, whereby a substantially constant direct current flow will be established despite fluctuations between said anodes and such tank.

7. The system as set forth in claim 6 further including a capacitor connected in parallel across each of said choke coils for leveling the waveshape of the direct current and for providing impedance to the flow of current.

8. The system as set forth in claim 7 wheerin the power source comprises the conventional 115 v., 60 Hz. power lines.

References Cited
UNITED STATES PATENTS

| | | | |
|---|---|---|---|
| 2,021,519 | 11/1935 | Polin | 204—196 |
| 3,143,670 | 8/1964 | Husock | 307—95 |
| 3,197,755 | 7/1965 | Conger | 204—196 |

JOHN H. MACK, *Primary Examiner.*

T. TUNG, *Assistant Examiner.*

U.S. Cl. X.R.
204—147